(12) United States Patent
Mahadeva et al.

(10) Patent No.: US 11,924,582 B2
(45) Date of Patent: Mar. 5, 2024

(54) INCLUSIVE VIDEO-CONFERENCE SYSTEM AND METHOD

(71) Applicant: ARRIS Enterprises LLC, Suwanee, GA (US)

(72) Inventors: Swaroop Mahadeva, Bangalore (IN); Jeyakumar Barathan, Bangalore (IN); Sadeesh Kumar Karuppiah, Bangalore (IN); Prasanneswar Ramachandran, Bangalore (IN); Smit M. Bharada, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 56 days.

(21) Appl. No.: 17/411,261

(22) Filed: Aug. 25, 2021

(65) Prior Publication Data

US 2022/0078377 A1 Mar. 10, 2022

Related U.S. Application Data

(60) Provisional application No. 63/076,082, filed on Sep. 9, 2020.

(51) Int. Cl.
*H04N 7/15* (2006.01)
*G06F 3/048* (2013.01)
(Continued)

(52) U.S. Cl.
CPC ............. *H04N 7/157* (2013.01); *G06F 3/048* (2013.01); *G06F 40/263* (2020.01); *G06V 20/46* (2022.01);
(Continued)

(58) Field of Classification Search
None
See application file for complete search history.

(56) References Cited

U.S. PATENT DOCUMENTS 7,830,408 B2 * 11/2010 Asthana ................. H04N 7/147
348/14.09
9,256,457 B1 * 2/2016 Leske .................. H04L 65/1069
(Continued)

FOREIGN PATENT DOCUMENTS

KR   10-2012-0073795 A   7/2012

OTHER PUBLICATIONS

Notification of Transmittal of the International Search Report (Forms PCT/ISA/220 and PCT/ISA/210) and the Written Opinion of the International Searching Authority (Form PCT/ISA/237) dated Dec. 15, 2021, by the International Application Division Korean Intellectual Property Office in corresponding International Application No. PCT/US2021/047514. (11 pages).

*Primary Examiner* — Quoc D Tran
(74) *Attorney, Agent, or Firm* — Panitch Schwarze Belisario & Nadel LLC

(57) ABSTRACT

Exemplary embodiments are directed to an inclusive video conferencing system having one or more input devices configured to receive conversational data according to a first video conferencing mode and data from a remote computing device identifying a second conferencing mode. A processing device configured to activate a video conferencing interface according to the second video conferencing mode of the remote computing device and process the conversational data for presentation in a format compatible with the second video conferencing mode. An output device configured to send the processed conversational data to the remote computing device.

20 Claims, 7 Drawing Sheets

(51) Int. Cl.
*G06F 40/263* (2020.01)
*G06V 20/40* (2022.01)
G06V 40/20 (2022.01)
G10L 15/26 (2006.01)

(52) U.S. Cl.
CPC ............ *H04N 7/152* (2013.01); *G06V 40/28* (2022.01); *G10L 15/26* (2013.01)

(56) References Cited

U.S. PATENT DOCUMENTS

| | | | |
|---|---|---|---|
| 10,038,783 B2* | 7/2018 | Wilcox | H04M 3/42391 |
| 10,659,730 B2* | 5/2020 | Chiang | H04W 4/12 |
| 10,992,793 B1* | 4/2021 | Medley | G10L 21/10 |
| 11,140,264 B1* | 10/2021 | Thomson | H04M 1/72475 |
| 2009/0037171 A1* | 2/2009 | McFarland | G10L 15/26 |
| | | | 704/235 |
| 2011/0246172 A1* | 10/2011 | Liberman | H04M 3/56 |
| | | | 348/14.09 |
| 2012/0329518 A1* | 12/2012 | Garg | G10L 13/00 |
| | | | 455/556.1 |
| 2015/0120825 A1* | 4/2015 | Waxman | H04L 67/75 |
| | | | 709/204 |
| 2017/0013236 A1 | 1/2017 | Caldwell | |
| 2019/0171716 A1 | 6/2019 | Weber | |

\* cited by examiner

INCLUSIVE VIDEO-CONFERENCE SYSTEM AND METHOD

FIELD

The present disclosure is related to a video conferencing system, and particularly a video conferencing system that allows communication for a plurality of language speakers and those with physical disabilities.

BACKGROUND

Persons with disabilities or physical impairments are important contributors to society and efforts of integrating them into everyday societal activities has led to major advances in technology. The technological advancements have not only improves the lives of those with disabilities, but it has had a positive effect on the user experiences as a whole. Improvements are prevalent in telecommunications, where advancements are used to provide the disabled access to applications, resources, solutions tied to the Internet.

Known systems described in US 2009/0037171, US 2012/0316882, and U.S. Pat. No. 8,566,077, EP 0658854 describe systems which can convert communication or conversational data received in one format into another format. For example, US 2009/0037171 describes a system which provides real-time voice transcription for speech and spatial-temporal acoustic data through speech recognition and speaker identification. US 2012/0316882 describes a system that generates captions for live video broadcasts or non-live broadcasts. U.S. Pat. No. 8,566,077 discloses a system and method that translates digital sign language of words, letters, and numbers. EP 0658854 describes a method and apparatus that displays sign language images for document data, speech data, and image data.

Presently, persons who have auditory, visual, and/or verbal impairments have challenges interacting with smart-home systems and/or Internet-of-Things technology. Currently, there is no video conferencing system that provides translation and/or transcription services for users of various linguistic backgrounds and/or various physical impairments.

SUMMARY

An exemplary method is disclosed, comprising: generating, in a processing device of a computing device, a first graphical interface for initiating a video conferencing session; receiving, via at least one input device of the computing device, a first video conferencing mode for a caller using the first graphical interface; determining, via the processing device of the customer premise device, a second video conferencing mode for a callee participating in the video conferencing session at a remote device; activating, in the processing device of the computing device, a video conferencing interface according to the second video conferencing mode of the callee; receiving, via the at least one input device of the computing device, conversational data from the caller in a format associated with the first video conferencing mode during the video conferencing session; processing, via the processing device of the computing device, the conversational data for presentation to the callee in a format associated with the second video conferencing mode; and sending, via an output device of the customer premise device, the processed conversational data to the remote computing device.

An exemplary system is disclosed, comprising: one or more input devices configured to receive conversational data according to a first video conferencing mode and data from a remote computing device identifying a second conferencing mode; a processing device configured to activate a video conferencing interface according to the second video conferencing mode of the remote computing device and process the conversational data for presentation in a format compatible with the second video conferencing mode; and an output device configured to send the processed conversational data to the remote computing device.

An exemplary non-transitory computer readable medium storing program code which causes a processing device to perform a method is disclosed, the method comprising the steps of: generating, in a processing device of a computing device, a first graphical interface for initiating a video conferencing session; receiving, via at least one input device of the computing device, a first video conferencing mode for a caller using the first graphical interface; determining, via the processing device of the customer premise device, a second video conferencing mode for a callee participating in the video conferencing session at a remote device; activating, in the processing device of the computing device, a video conferencing interface according to the second video conferencing mode of the callee; receiving, via the at least one input device of the computing device, conversational data from the caller in a format associated with the first video conferencing mode during the video conferencing session; processing, via the processing device of the computing device, the conversational data for presentation to the callee in a format associated with the second video conferencing mode; and sending, via an output device of the customer premise device, the processed conversational data to the remote computing device.

DETAILED DESCRIPTION

Exemplary embodiments of the present disclosure are directed to an inclusive video conference (IVC) system and method. The IVC system is based on a disability inclusion design principle and provides methods that includes use of multiple hardware, software subcomponents which enables a video conferencing solution for a Smart media device (SMD) that is inclusive and accessible to persons of varied languages and physical impairments. The exemplary IVC system described herein can receive conversational data for a video conference from each participant and process the received data so that it can be presented to another video conference participant in a format suitable for them to understand.

Figure 1:
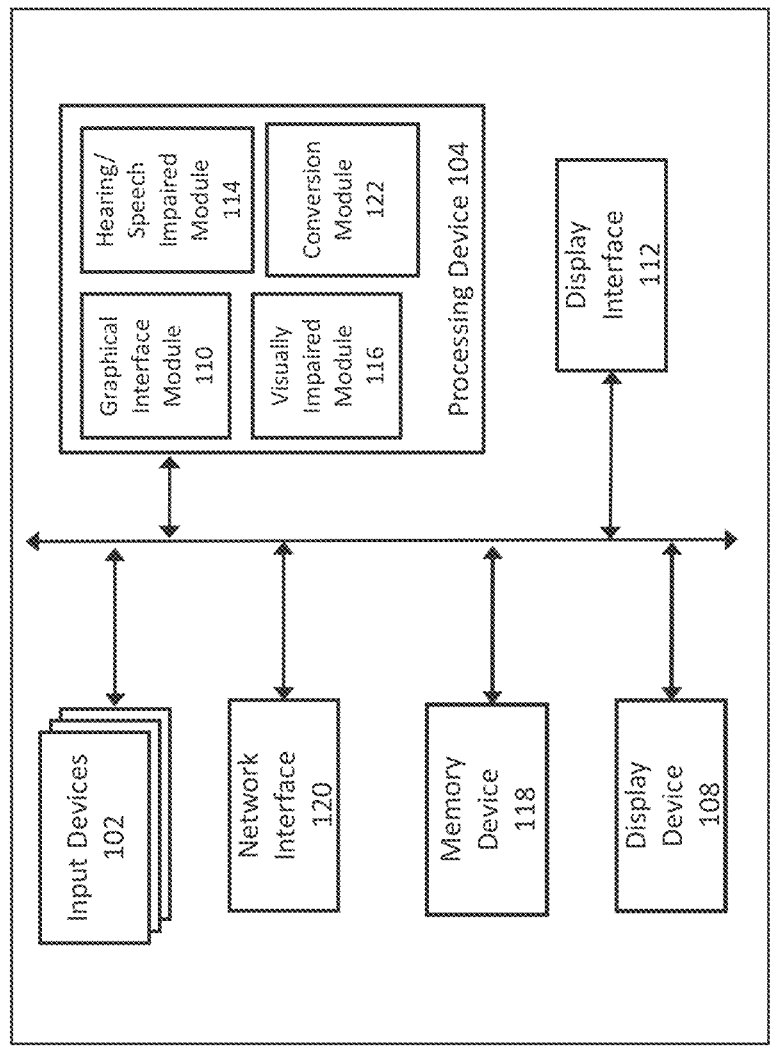
FIG. 1 illustrates an exemplary inclusive video conferencing system for conducting a video conference in accordance with an exemplary embodiment of the present disclosure.

FIG. 1 illustrates an exemplary IVC system 100 for conducting an inclusive video conference in accordance with an exemplary embodiment of the present disclosure.

As shown in FIG. 1, the IVC system 100 can include a combination of hardware and software components for enabling video conferencing access to persons having diverse languages and physical challenges.

The IVC system 100 can be configured as a smart media hub that includes one or more input devices 102 configured to receive conversational data according to a first communication mode and data from a remote device identifying a second communication mode. For example, the one or more input devices 102 can include far-field microphones for receiving a speech or voice input, a video or still-image camera for receiving a video stream or a plurality of images, a physical or virtual keyboard, a touch display or other suitable input device as desired. The conversational data can include one or more of live text, speech or voice, with or without live video. According to an exemplary embodiment, the conversational data can also include live video of sign language performed by a user. The IVC system 100 can include a processing device 104 having one on or more modules for performing operations and functions for facilitating an interactive video conference. The processing device 104 can be configured to include a graphical interface module 110 for generating one or more control signals for displaying a graphical interface for a video conference on a display device 108. The graphical interface 110 can be used to select one of a plurality of video conferencing modes for a caller participating in a video conferencing session. According to an exemplary embodiment, the processing device 104 can communicate the one or more control signals to the display device 108 via a display interface 112. The display interface 112 can include a combination of hardware and software components for converting the control signals into a format and protocol suitable for communicating with the display device 108 to which it is connected. The display device 108 can include any of a liquid crystal display (LCD), light-emitting diode (LED), organic light emitting diode (OLED), electroluminescent display (ELD), plasma display panels (PDP), quantum dot light emitting diode (QLED), or any other suitable display technology as desired.

According to an exemplary embodiment, the plurality of video conferencing modes in which a caller initiates video conferencing session to communicate conversational data with a callee can include, for example, a normal mode, hearing impaired mode, visually impaired mode, and a speech impaired mode. The normal mode can define a video conferencing session in which a caller communicates with a callee according to a voice, video, and/or text input. According to an exemplary embodiment, the voice and/or text input can be received in a native language of the callee. According to an exemplary embodiment, in the hearing impaired mode and/or speech impaired modes the processing device 104 can be configured to activate one or more input devices which are suitable for the caller to input conversational data by voice, text, or sign language. According to an exemplary embodiment, a video camera can be used to input conversational data using sign language. The processing device 104 can be configured to execute a hearing/speech impaired module 114, which performs image processing (e.g., recognition) on the captured video images according to known algorithms to identify the words, phrases, and/or characters spoken by the caller. According to another exemplary embodiment, the one or more input devices can include a Braille-enabled touch device for inputting or outputting sensory data to a user. When the Braille-enabled touch device is used, the processing device 104 can be configured to execute a visually impaired module 116, which performs one or more algorithms for encoding conversational data received from a callee or decoding conversational data input by a caller. According to an exemplary embodiment, the processing device can be configured to execute any combination of the hearing impaired module and the visually impaired module based on the one or more active input devices and/or video conferencing mode selected by the caller.

According to yet another exemplary embodiment, the IVC system 100 can include a memory device 118, which stores data identifying a preferred video conference mode of the caller. For example, the data can be stored in association with a user profile of the caller or stored in association with a last video conferencing session and/or video conferencing history of the caller.

The processing device 104 can also be configured to determine a selected video conferencing mode for one or more callees participating in the video conference session at a remote device. According to an exemplary embodiment, the processing device 104 can be configured to obtain data identifying a preferred video conferencing mode of the callee. For example, the IVC system 100 can include a network interface 120 through which the processing device 104 can send and receive signals for communicating with the remote device of the callee during a video conferencing session. According to an exemplary embodiment, the processing device 104 can generate one or more signals for requesting video conferencing mode data from the remote device or the IVC system of the callee.

The processing device 104 can be configured to activate a video conferencing interface for initiating the video conferencing session between the caller and one or more callees. For example, the processing device 104 can generate a video conferencing interface having one or a combination of windows according to a number of callees participating in the video conferencing session according to the data related to the identified conferencing modes of the caller and callee. According to an exemplary embodiment, the video conferencing interface can include one or more tiled windows where each window corresponds to a specified callee. According to another exemplary embodiment, the video conferencing interface can include a main window with one or more nested sub-windows, where each sub-window corresponds to a specified callee.

During the video conferencing session, the IVC system 100 can be configured to receive conversational data from the caller in a format associated with the caller's selected video conferencing mode. The processing device 104 can be configured to process the conversational data for presentation to the callee in a format associated with the second video conferencing mode. The processing device 104 can include a conversion module 122 for converting the conversational data input by the caller to another conversational data format suitable for receipt and/or understanding by the callee based on the callee's selected video conferencing mode. Table 1 illustrates the conversions performed by the conversion module according to the selected video conferencing modes of the caller and callee for the video conferencing session.

TABLE 1

| Caller's Video Conferencing Mode | Callee's Video Conferencing Mode | Conversion Type |
|---|---|---|
| Normal (Language 1) | Normal (Language 2) | Translation cum transcription (text) |
| Normal | Hearing Impaired | Speech-to-text |
| Speech Impaired | Normal | Sign Language to Text |
| Normal | Hearing Impaired | Text/Speech to Sign Language |
| Speech Impaired | Visually Impaired | Sign Language to Text Text to Speech |
| Normal | Visually Impaired Speech Impaired Hearing Impaired | Text or Speech to Braille-enabled touch sensory data |

As shown in Table 1, the processing device 104 via the conversion module 122 can be configured to execute and/or access one or more algorithms for performing the specified conversion. For example, the conversion module 122 can be configured with a neural network having one or more conversion models trained to translate the input conversational data of a caller to the conversational data format of a callee. According to an exemplary embodiment, the conversion module 122 can be further configured with known or proprietary integrated cloud application services for supporting video conferencing with live linguistic translation cum transcription, live speech-to-text transcription, sign language to text encoding/decoding services, text or speech to sign language video animation, sign language-to-text and text-to-speech synthesis or any other suitable conversion services available through cloud computing services.

The processing device 104 can be configured to provide the converted or processed data to the network interface 120 for sending the processed conversational data to the remote device of the callee via the network.

It should be understood that each IVC system 100 is configured for two-way communication with other client devices 202 during a video conferencing session in that each IVC system operates both as a caller and callee ether in parallel or at various times during a video conferencing session.

Figure 2A:
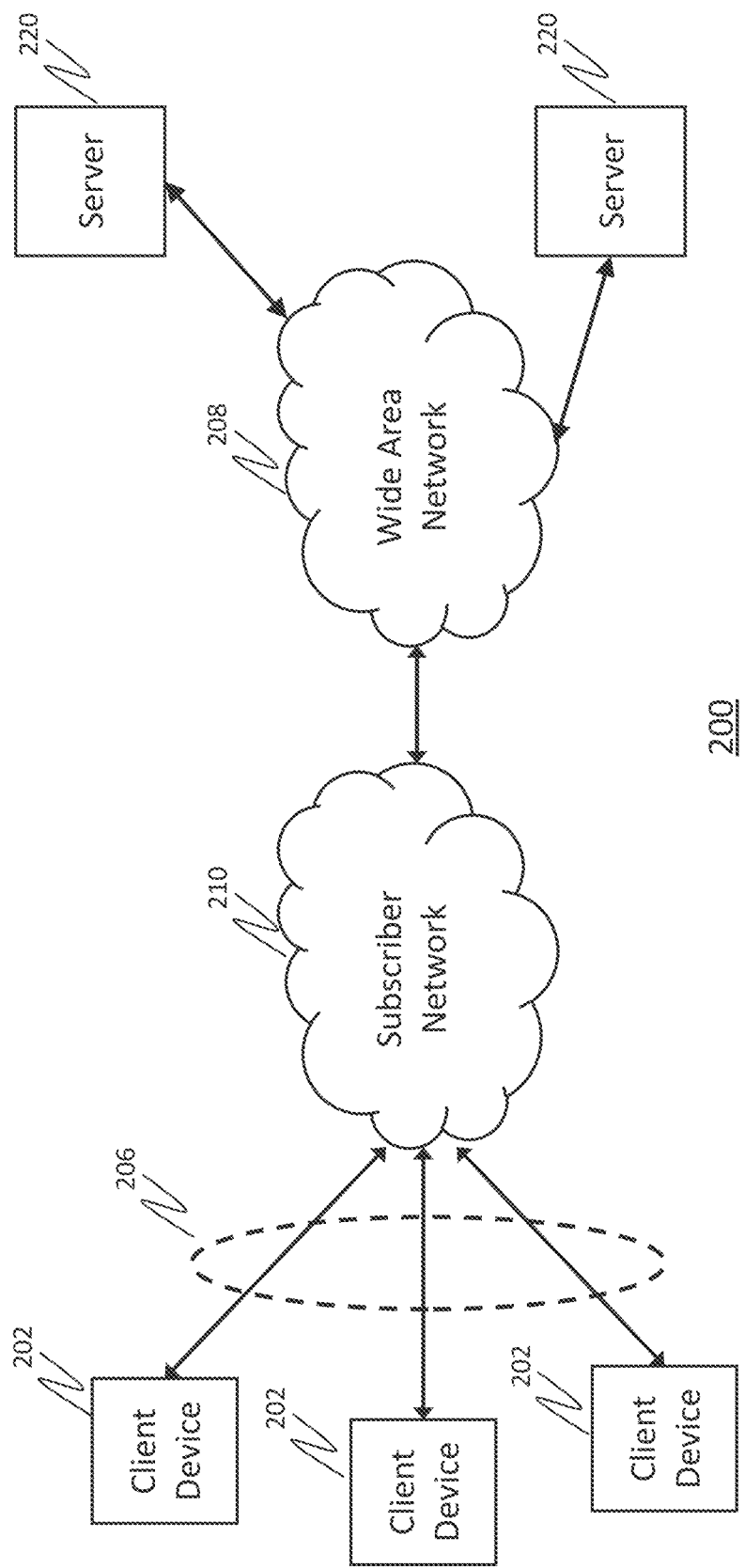
FIG. 2A illustrates a network environment operable to facilitate an interactive video system in accordance with an exemplary embodiment of the present disclosure.

FIG. 2A illustrates a network environment 200 operable to facilitate an interactive video system in accordance with an exemplary embodiment of the present disclosure.

The network environment 200 provides for the delivery of video, voice, and/or data services to one or more client devices 202, such as a television, a mobile device, a tablet, a computer, an IVC system 100, a consumer premise device, or suitable computing device as desired. Multiple services may be delivered to client devices 202 over a local or home network 206.

The local network 206 may include a local area network (LAN), wireless local area network (WLAN), personal area network (PAN), mobile hotspot network, and others. The local network 206 may be provided at a subscriber's premise or residence by a gateway device, modem device, a smart media device, or other suitable access device. It will be appreciated by those skilled in the relevant art that delivery of the multiple services over the local network 206 may be accomplished using a variety of standards and formats.

According to exemplary embodiments of the present disclosure, multiple services (e.g., video, voice, and/or data services) may be delivered from a wide-area network (WAN) 208 to the local network 206 through a connection to a subscriber network 210. The subscriber network may include an optical network, hybrid fiber coaxial (HFC) network, twisted-pair, mobile network, high-speed data network, and others. Multiple systems operator (MSO) devices and/or network within the WAN 208 may be used to provide, manage, and/or troubleshoot the multiple services provided to subscribers.

It will be appreciated by those skilled in the relevant art that client devices 202 may be capable of interacting and communicating with each other over various wireless communication standards (e.g., Wi-Fi, Bluetooth, etc.). The client devices 202 connected to a local or home network 206 may receive services according to one or more subscriptions between a subscriber and service provider.

According to exemplary embodiments, a client device 202 such as IVC system 100 can be configured to provide a subscriber with an interface for managing content received and displayed by one or more other target devices (e.g., client devices 202, smart televisions, STBs, smart media devices, and/or other device that may communicate over the home network 206). For example, a subscriber can access an application such as an application for inclusive video conferencing.

A subscriber can initiate at a client device 202 (i.e., a control device and/or target device), an inclusive video conferencing application and provide conversational data in a format specified by one or more other users participating in the video conferencing session.

The network environment 200 also includes one or more servers 220. The servers can be configured to execute, access, and/or provide applications and/or services used by the one or more client devices 202 to establish and conduct a video conferencing session.

Figure 2B:
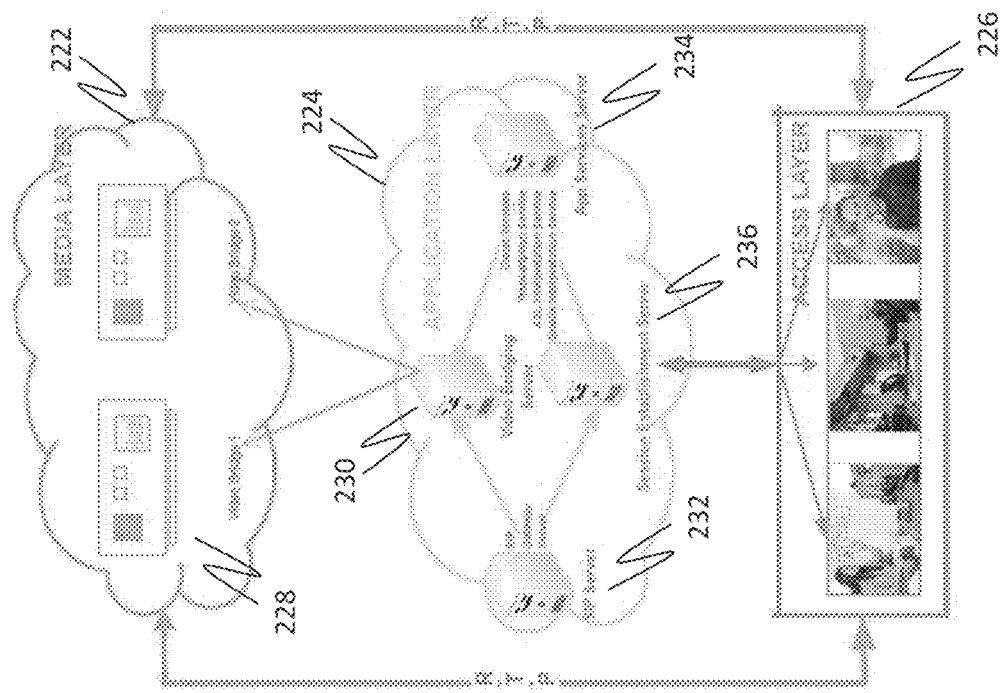
FIG. 2B is a block diagram of a system of hardware and software structure of a network environment operable to generate an inclusive video conferencing system and method in accordance with an exemplary embodiment.

FIG. 2B is a block diagram of a hardware and software structure of the network environment 200 operable to generate an inclusive video conferencing system and method in accordance with an exemplary embodiment.

As shown in FIG. 2B, the network environment 200 can have multiple layers of functionality including a media layer 222, an application layer 224, and an access layer 226. The network environment 200 can be configured to operate in a wide area network, cloud computing environment, or other suitable network or computing arrangement, in which data, audio and video content, and/or applications and services can be communicated (e.g., transmitted and/or received) with remote or client devices using a real-time transport protocol by the one or more servers 220. The media layer 222 can include a combination of hardware and software systems, devices, and/or components for transmitting and receiving audio, video, graphical, and multimedia content with remote or client devices on the network during a video conferencing session. For example, the media layer can include video bridges 228 for internetworking streaming video content from remote devices of different users. The application layer 224 includes a combination of hardware and software devices, as provided for example in one or more servers 220, and can be configured to specify services and applications for access by remote devices over the network. The application layer 224 can also specify shared communications protocols and interface methods, such as a real-time transport protocol (RTP), Internet protocol or other suitable protocol as desired, which is used by the servers 220 in communicating with clients and remote devices on the network. For example, the application layer 224 can include a Video Bridging Server 230 which is configured to provide bridging services for linking a plurality of users together in a video conferencing session using remote devices configured for audio and video communication. The application layer 224 can also include a Session Initiation Protocol (SIP) Server 232 which is configured to establish an interaction between two more nodes or devices for exchanging information. According to an exemplary embodiment the SIP server can be configured to enable voice over Internet Protocol (VOIP) connections. The application layer 224 can also include an application services server 234 which can be configured with software or modules for providing various cloud services such as, transcription services, sign language interpretation services (e.g., American Sign Language Interpretation), Braille interpretation services, and other services and/or applications suitable for an inclusive video conferencing system and method according to exemplary embodiments disclosed herein. The application layer 224 can also include a Session Establishment Server 236 which can be configured to provide video conference session services for a plurality of users at remote computing devices. The access layer 226 includes a combination of hardware and software devices for enabling end-users or subscribers access to the audio, video, graphical, and multimedia content provided by the media layer 222 and the applications and/or services provided by the application layer 226.

Figure 3:
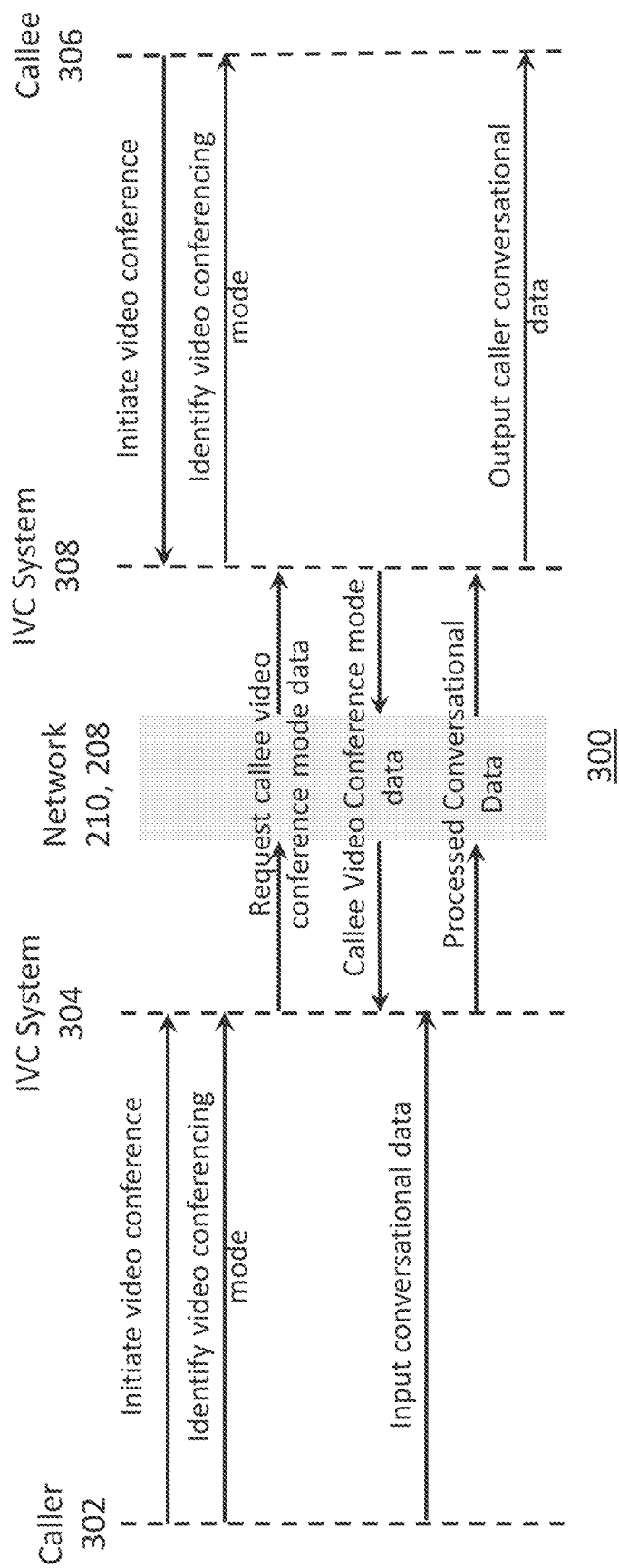
FIG. 3 illustrates a transition diagram for conducting an inclusive video conference in accordance with an exemplary embodiment of the present disclosure.

FIG. 3 illustrates a transition diagram 300 for conducting an inclusive video conference in accordance with an exemplary embodiment of the present disclosure.

As shown in FIG. 3, the IVC system 304 of a caller 302 can be used to initiate a video conferencing session with the IVC system 308 of a callee 306. The caller 302 can select one of a plurality of video conferencing modes. Once the caller has selected the video conferencing mode, the IVC system 304 can send a request via at least the subscriber network 210 to the IVC system 308 of the callee 304 for obtaining data identifying a selected video conferencing mode of the callee 306. In response to the request, the IVC system 308 of the callee 306 sends the requested data to the IVC system 304 via the subscriber network 210. The IVC system 304 activates a video conferencing interface for the video conferencing session according to the first and second video conferencing modes of the caller 302 and the callee 306. During the video conferencing session, the callee 306 inputs conversational data to the IVC system 304 using one or more input devices 102. The IVC system 304 can send the conversational data to the subscriber network 210 for converting the conversational data input by the caller 304 to conversational data suitable for receipt by the callee 306 based on the callee's 306 identified video conferencing mode. The IVC system 308 of the callee 306 receives the conversational data of the IVC system 204 of the caller 302 after processing on the subscriber network 210. The IVC system 308 outputs the conversational data of the caller 302 to the callee 306 in the format associated with the selected video conferencing mode at the IVC system 308.

Figure 4:
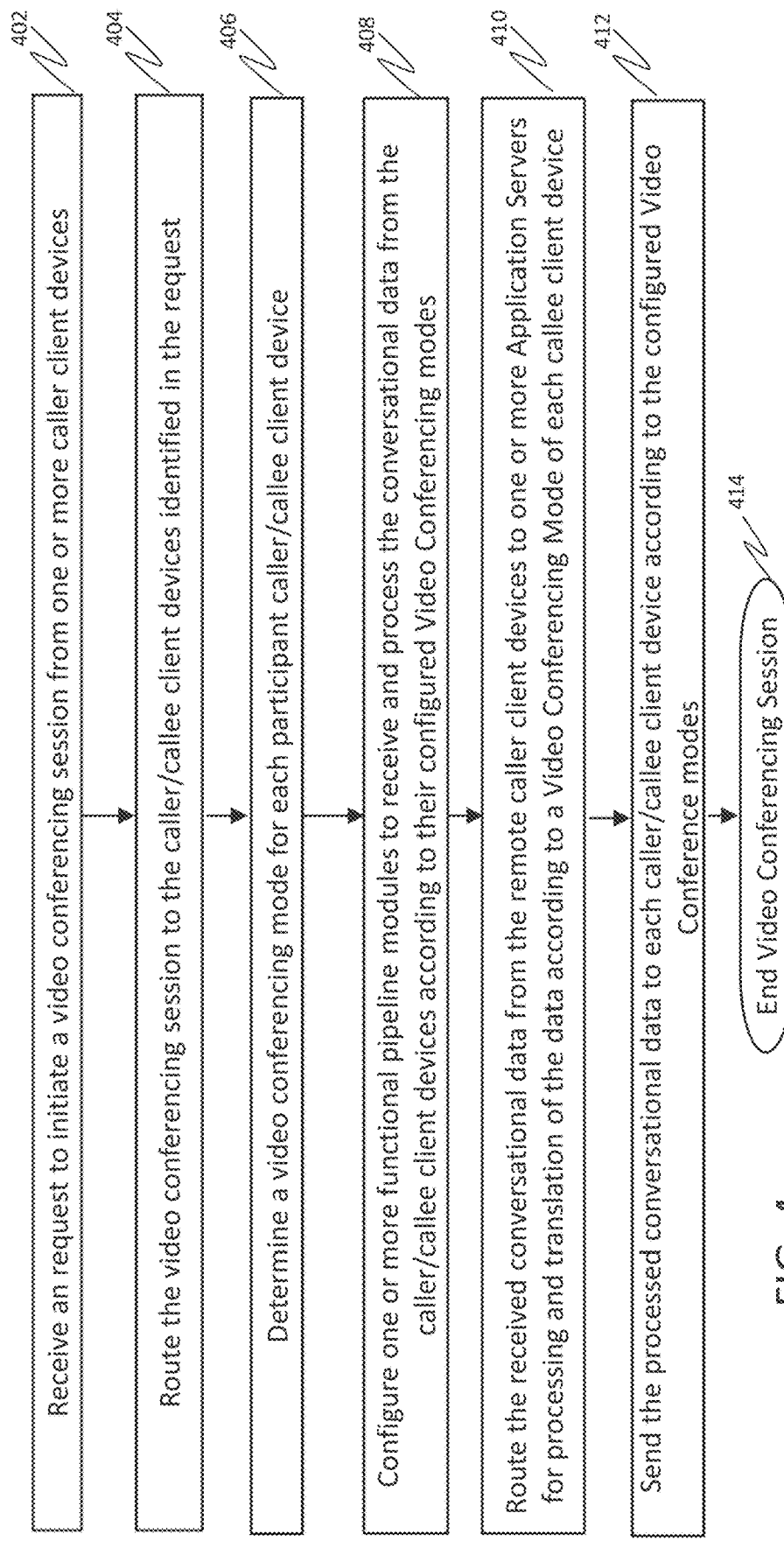
FIG. 4 illustrates a method for conducting an inclusive video conference at a server device in accordance with an exemplary embodiment of the present disclosure.

FIG. 4 illustrates a method 400 for conducting an inclusive video conference (IVC) at a remote computing device in accordance with an exemplary embodiment of the present disclosure.

As shown in FIG. 4, a caller 302 at a client device 202, such as an IVC system 304, can generate a request to initiate a video conferencing session, which is received at a server 220, such as a Session Establishment Server 236 (Step 402). At Step 404, the Session Establishment Server 236 can route the video conferencing session to the caller/callee IVC systems 304, 308 identified in the request in combination with the Video Bridging Server 230 and the Session Initiation Protocol Server 232. The Session Establishment Server 236 can determine a video conferencing mode for each participant caller/callee client device 202 (Step 406). The Session Establishment Server 236 can configure one or more functional pipeline modules to receive and process the conversational data from the caller/callee IVC systems 304, 308 according to configured Video Conferencing modes of each client device 202 (Step 408). At step 410, the Session Establishment Server 236 can route the received conversational data from the caller IVC system 304 to one or more Application Servers 234 for processing and translation of the data according to a Video Conferencing Mode of each callee client device 202. The one or more Application Servers 234 can send the processed conversational data to each caller/callee IVC system 304, 308 in combination with the Video Bridging Server 230 according to the configured Video Conference modes of each IVC system 304, 308 (Step 412). The Video Conferencing Session can be terminated at one or more participating IVC systems 304, 308 by the Session Establishment Server 236 based on a request initiated by one or more of the IVC systems 304, 308 or by the Session Establishment Server 236 according to provider or account settings.

Figure 5:
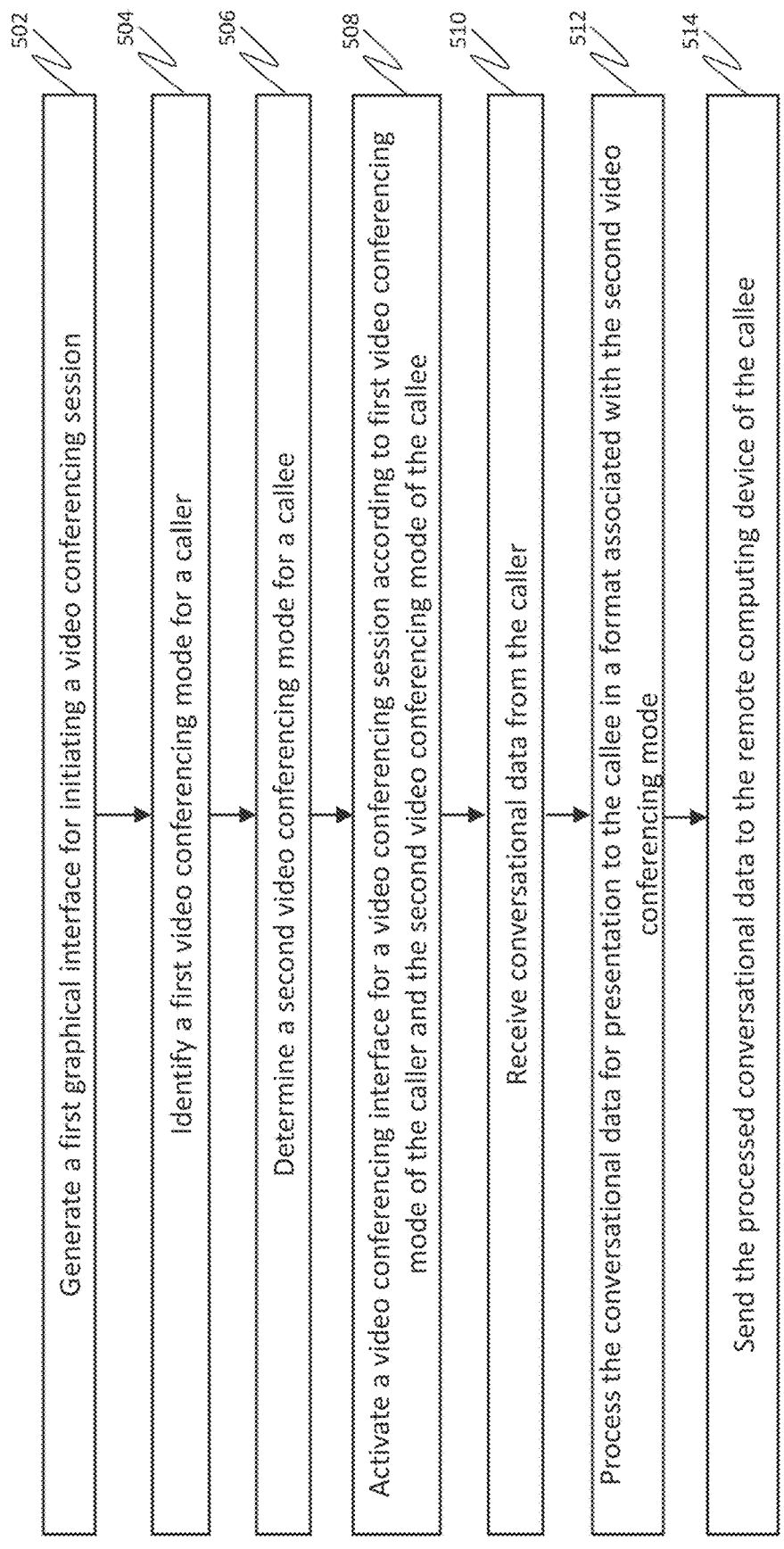
FIG. 5 illustrates a method for conducting an inclusive video conference at a remote computing device in accordance with an exemplary embodiment of the present disclosure.

FIG. 5 illustrates a method 500 for conducting an inclusive video conference (IVC) at a remote computing device in accordance with an exemplary embodiment of the present disclosure.

As shown in FIG. 4, the method 500 includes generating, in a processing device 104 of a computing device such as the IVC system 304 of a caller 302, a first graphical interface for initiating a video conferencing session (Step 502). The processing device 104 identifies a first video conferencing mode for receiving conversational data from a caller during the video conferencing session (Step 504). According to an exemplary embodiments, identifying the first video conferencing mode can be determined based on a manual input or selection of the user via an interface, a prior video conferencing mode from a session history, a preferred video conferencing mode from a user preferences setting, or automatically prior to or during a video conferencing session. The IVC system 304 or the caller 302 can leverage or access the processing capabilities of one or more servers 220 on the network 108, 110, such as the one or more servers shown in FIG. 4. For example, the IVC system 304 can receive, via the at least one input device 102, a voice or speech input either before the video conferencing session or as conversational data from the caller during the video conferencing session and determine, via the processing device 104, the first video conferencing mode as a normal mode, for example, from analysis or recognition of the voice or speech input of the user. In another example, the IVC system 304 can receive, via the at least one input device 102 including a microphone, a voice or speech input either before the video conferencing session or as conversational data from the caller during the video conferencing session, and generate, via the processing device 104, a transcript of the voice or speech input. The processing device 104 can determine the first video conferencing mode in a preferred language, for example, based on a linguistic analysis of the transcript.

In yet another example, the IVC system 304 can capture, via the at least one input device 102 including a camera or image sensor, one or more video frames of a user either before the video conferencing session or as conversational data from a caller during the video conferencing session. The processing device 104 can process the one or video frames to recognize sign language of a user and determine the first video conferencing mode as a sign language mode from the recognized sign language.

In another example, the IVC system 304 can detect, via the processing device 104, whether a specified type of the one or more input devices 102 is connected to the IVC system 304. For example, the specified type of the one or more input device can include a Braille sensory device (e.g., Braille-enabled touch interface) or other device used for a particular type of impairment. The processing device 104 can determine the first video conferencing mode, such as a vision impaired mode, based on the connection of the specified type of input device 102.

The processing device 104 determines a second video conferencing mode for outputting conversational data to a callee during the video conferencing session (Step 506). The processing device 104 activates a video conferencing interface for the video conferencing session according to first video conferencing mode of the caller 302 and the second video conferencing mode of the callee 306 (Step 508). The IVC system 304 of the caller 302 receives conversational data from the caller 302 over or via the network 208, 210 in a format associated with the first video conferencing session (Step 510). The processing device 104 of the IVC system 304 of the caller 302 can process the conversational data for presentation to the callee in a format associated with the second video conferencing mode. According to an exemplary embodiment, the IVC system 304 can leverage the processing capabilities provided by one or more servers 220 on the network 208, 210 (see FIG. 4). For example, the caller IVC system 304 can send the conversational data to the network 208, 210 or access one or more applications executed by one or more servers 220 on the network 208, 210 to process the conversational data by converting it to a format suitable for presentation to the callee according to the second video conferencing mode at the IVC system 308 of the callee 306 (Step 512).

Figure 6:
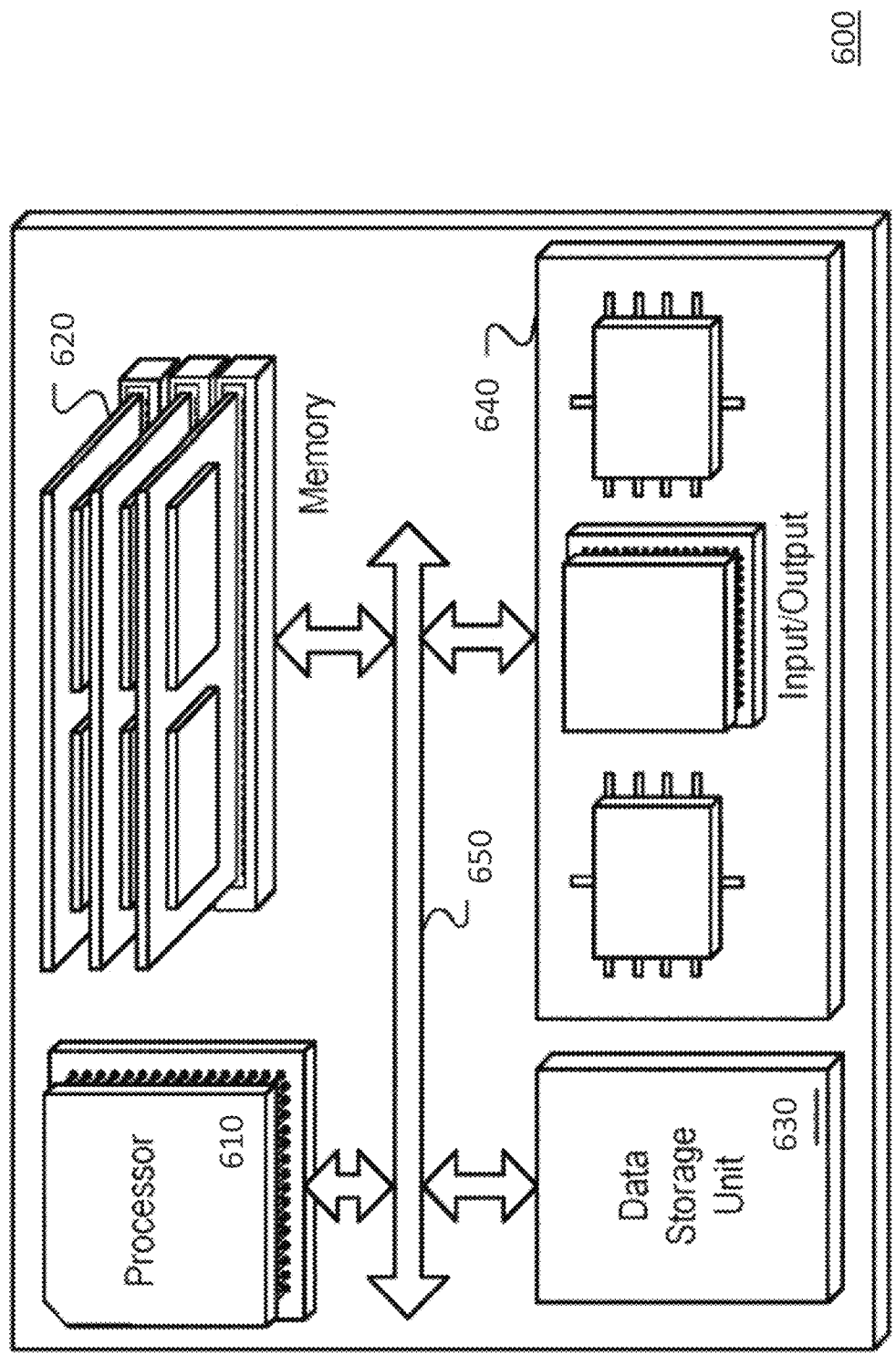
FIG. 6 is a block diagram of a hardware configuration operable to generate an inclusive video conferencing system and method in accordance with an exemplary embodiment of the present disclosure.

FIG. 6 is a block diagram of a hardware configuration 600 operable to generate an inclusive video conferencing system and method in accordance with an exemplary embodiment of the present disclosure. It should be understood that exemplary embodiments of the present disclosure can be implemented using one or more hardware configurations 600 having any combination of features, functions, and/or components described in the discussion that follows and connected to communicate over a network.

The hardware configuration 600 can include a processor (e.g., processing device) 610, a memory (e.g., memory device) 620, a storage device 630, and an input/output device 640. Each of the components 610, 620, 630, and 640 can, for example, be interconnected using a system bus 650. The processor 610 can be capable of processing instructions for execution within the hardware configuration 600. In one implementation, the processor 610 can be a single-threaded processor. In another implementation, the processor 610 can be a multi-threaded processor. The processor 610 can be capable of processing instructions stored in the memory 620 or on the storage device 630.

The memory 620 can store information within the hardware configuration 600. In one implementation, the memory 620 can be a computer-readable medium. In one implementation, the memory 620 can be a volatile memory unit. In another implementation, the memory 620 can be a non-volatile memory unit.

In some implementations, the storage device 630 can be capable of providing mass storage for the hardware configuration 600. In one implementation, the storage device 630 can be a computer-readable medium. In various different implementations, the storage device 630 can, for example, include a hard disk device, an optical disk device, flash memory or some other large capacity storage device. In other implementations, the storage device 630 can be a device external to the hardware configuration 600.

The input/output device 640 provides input/output operations for the hardware configuration 600. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 202 of FIG. 1 (e.g., television, mobile device, tablet, computer, STB, etc.). In embodiments, the input/output device can include driver devices configured to send communications to, and receive communications from one or more networks (e.g., subscriber network, WAN, local network, etc.).

According to exemplary embodiments the functional operations described herein can be provided in digital electronic circuitry, or in computer software, firmware, or hardware, including the structures disclosed in this specification and their structural equivalents, or in combinations of one or more of them. Some embodiments of the subject matter of this disclosure, and components thereof, can be realized by software instructions that upon execution cause one or more processing devices to carry out processes and functions described above. Further embodiments of the subject matter described in this specification can be implemented as one or more computer program products, i.e., one or more modules of computer program instructions encoded on a tangible program carrier for execution by, or to control the operation of, data processing apparatus.

One or more exemplary computer programs (also known as a program, software, software application, script, or code) for executing the functions of the exemplary embodiments disclosed herein, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

In some embodiments, the processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. According to exemplary embodiments, an apparatus or device embodying the invention may be in the form of a gateway, an access point, a set-top box or other standalone device, or may be incorporated in a television or other content playing apparatus, or other device, and the scope of the present invention is not intended to be limited with respect to such forms.

Components of some embodiments may be implemented as Integrated Circuits (IC), Application-Specific Integrated Circuits (ASIC), or Large Scale Integrated circuits (LSI), system LSI, super LSI, or ultra LSI components. Each of the processing units can be many single-function components, or can be one component integrated using the technologies described above. Components may also be implemented as a specifically programmed general purpose processor, CPU, a specialized microprocessor such as Digital Signal Processor that can be directed by program instructions, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

It is also contemplated that implementations and components of embodiments can be done with any newly arising technology that may replace any of the above implementation technologies.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, where operations are depicted in the drawings in a particular order, this should not be understood as requiring that such operations be performed in the particular order shown or in sequential order unless otherwise noted, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the preceding discussion used Wi-Fi and/or Ethernet communication protocols as illustrative examples, in other embodiments a wide variety of communication protocols and, more generally, adaptive balancing techniques may be used. Thus, the adaptive balancing technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the adaptive balancing technique may be implemented using program instructions, operating system (such as a driver for interface circuit) or in firmware in an interface circuit. Alternatively or additionally, at least some of the operations in the adaptive balancing technique may be implemented in a physical layer, such as hardware in an interface circuit.

The preceding description may refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

Having described the invention in detail, it will be understood that such detail need not be strictly adhered to, but that additional changes and modifications may suggest themselves to one skilled in the art.

What is claimed is:

1. A method comprising:
generating, in a processing device of a computing device, a first graphical interface for initiating a video conferencing session;
receiving, via at least one input device of the computing device, a request from a caller to initiate the video conferencing session with a callee, the request input via the first graphical user interface;
identifying, via the at least one input device of the computing device, a first video conferencing mode for the caller using the first graphical interface;
determining, via the processing device of a customer premise device, a second video conferencing mode for the callee participating in the video conferencing session at a remote computing device;
in response to identifying the first video conferencing mode of the caller and determining the second video conferencing mode of the callee, activating, in the processing device of the computing device, a video conferencing interface according to the first video conferencing mode of the caller and the second video conferencing mode of the callee;
receiving, via the at least one input device of the computing device, conversational data from the caller in a format associated with the first video conferencing mode during the video conferencing session;

processing, via the processing device of the computing device, the conversational data for presentation to the callee in a format associated with the second video conferencing mode; and sending, via an output device of the customer premise device, the processed conversational data to the remote computing device of the callee.

2. The method of claim 1, wherein identifying the first video conferencing mode comprises:

receiving, via the at least one input device of the customer premise device, user data identifying the first video conferencing mode.

3. The method of claim 1, wherein identifying the first video conferencing mode comprises:

determining, via the processing device of the customer premise device, the first video conferencing mode from data included in a user profile stored in a memory location.

4. The method of claim 1, wherein identifying the first video conferencing mode comprises:

determining, via the processing device of the customer premise device, the first video conferencing mode from a last video conferencing mode in a memory location.

5. The method of claim 1, wherein determining the second video conferencing mode comprises:

obtaining, via a network interface of customer premise device, data from the remote device identifying the second video conferencing mode at the remote computing device.

6. The method of claim 1, wherein identifying the first video conferencing mode comprises:

receiving, via the at least one input device of the computing device, a voice or speech input as the conversational data from the caller; and determining, via the processing device of the customer premise device, the first video conferencing mode is a normal mode from the voice or speech input of the caller.

7. The method of claim 1, wherein identifying the first video conferencing mode comprises:

receiving, via the at least one input device of the computing device, a voice or speech input as the conversational data from the caller;

generating, via the processing device of the computing device, a transcript of the voice or speech input; and determining, via the processing device of the customer premise device, a native language of the first video conferencing mode from the transcript.

8. The method of claim 1, wherein identifying the first video conferencing mode comprises:

capturing, via the at least one input device of the computing device, one or more video frames as the conversational data from the caller;

processing, via the processing device of the computing device, the one or video frames to recognize sign language of a user; and determining, via the processing device of the customer premise device, the first video conferencing mode from the recognized sign language.

9. The method of claim 1, wherein identifying the first video conferencing mode comprises:

detecting, via the processing device of the computing device, whether a specified type of input device is connected to the computing device; and determining, via the processing device of the customer premise device, the first video conferencing mode based on the connection of the specified type of input device to the computing device being detected.

10. The method of claim 1, wherein activating the video conferencing interface comprises:

generating, via the processing device of the customer premise device, a window which outputs conversational data according to the second video conferencing mode of the remote computing device.

11. The method of claim 1, wherein processing the conversational data comprises:

translating the conversational data from a first language to a second language.

12. The method of claim 1, wherein processing the conversational data comprises:

transcribing the conversational data from live speech to text.

13. The method of claim 1, wherein processing the conversational data comprises:

converting the conversational data from sign language to text.

14. The method of claim 1, wherein processing the conversational data comprises:

converting the conversational data from text or live speech to sign language video animation.

15. A system, comprising:

one or more input devices configured to:
receive a request from a caller to initiate a video conferencing session with a callee,
identify a first video conferencing mode for the caller using the first graphical interface;

a processing device configured to:
determine a second video conferencing mode for the callee participating in the video conferencing session at a remote computing device,
in response to identifying the first video conferencing mode of the caller and determining the second video conferencing mode of the callee, activate a video conferencing interface according to the first video conferencing mode of the caller and the second video conferencing mode of the callee;

the one or more input devices further configured to receive conversational data from the caller in a format associated with the first video conferencing mode during the video conferencing session;

the processing device further configured to process the conversational data for presentation to the callee in a format associated with the second video conferencing mode, and an output device configured to send the processed conversational data to the remote computing device of the callee.

16. The system of claim 15, wherein the processing device is configured to generate a transcript of a voice or speech input of the received conversational data, and determine a native language of the first video conferencing mode from the transcript.

17. The system of claim 16, wherein the processing device is configured to process one or video frames received as the conversational data and recognize sign language of a caller from the one or more video frames, and determine the first video conferencing mode is a hearing impaired or speech impaired mode from the recognized sign language.

18. The system of claim 16, wherein the processing device is configured to determine the first video conferencing mode is a normal mode from voice or speech received as the conversational data.

19. The system of claim 16, wherein the processing device is configured to detect whether a specified type of the one or more input device is connected and determine the first video conferencing mode based on the detected of the specified type of the one or more input devices.

20. A non-transitory computer readable medium storing program code which causes a processing device to perform a method comprising the steps of:

generating, in a processing device of a computing device, a first graphical interface for initiating a video conferencing session;

receiving, via at least one input device of the computing device, a request from a caller to initiate the video conferencing session with a callee, the request being input via the first graphical user interface and the request identifying a first video conferencing mode for the caller;

determining, via a processing device of the customer premise device, a second video conferencing mode for the callee participating in the video conferencing session at a remote device;

in response to identifying the first video conferencing mode of the caller and determining the second video conferencing mode of the callee, activating, in the processing device of the computing device, a video conferencing interface according to the first video conferencing mode of the caller and the second video conferencing mode of the callee;

receiving, via the at least one input device of the computing device, conversational data from the caller in a format associated with the first video conferencing mode during the video conferencing session;

processing, via the processing device of the computing device, the conversational data for presentation to the callee in a format associated with the second video conferencing mode; and sending, via an output device of the customer premise device, the processed conversational data to the remote computing device.

\* \* \* \* \*